United States Patent
Hickman et al.

(10) Patent No.: US 7,530,371 B2
(45) Date of Patent: *May 12, 2009

(54) INSULATOR APPARATUS FOR VACUUM INSULATED TUBING

(76) Inventors: Cole J. Hickman, P.O. Box 1306, Stafford, TX (US) 77497; James H. Cannon, P.O. Box 1306, Stafford, TX (US) 77497

(*) Notice: Subject to any disclaimer, the term of this patent is extended or adjusted under 35 U.S.C. 154(b) by 0 days.

This patent is subject to a terminal disclaimer.

(21) Appl. No.: 11/395,870

(22) Filed: Mar. 31, 2006

(65) Prior Publication Data

US 2006/0237085 A1    Oct. 26, 2006

Related U.S. Application Data (62) Division of application No. 10/744,575, filed on Dec. 22, 2003, now Pat. No. 7,134,455.

(60) Provisional application No. 60/434,903, filed on Dec. 20, 2002.

(51) Int. Cl.
*F16L 9/00* (2006.01)

(52) U.S. Cl. .................. 138/114; 138/148; 138/149; 138/155; 138/120; 285/53; 285/47; 166/241.7; 166/241.4

(58) Field of Classification Search ............... 138/114, 138/148, 149, 155, 109; 285/47, 45, 390, 285/383, 123.3; 166/241.7, 241.4, 175, 302, 166/378

See application file for complete search history.

(56) References Cited

U.S. PATENT DOCUMENTS

| | | | | |
|---|---|---|---|---|
| 2,594,551 | A * | 4/1952 | Morgan | 166/241.7 |
| 3,740,801 | A * | 6/1973 | Sears et al. | 166/241.7 |
| 4,332,401 | A * | 6/1982 | Stephenson et al. | 285/47 |
| 4,340,245 | A * | 7/1982 | Stalder | 285/53 |
| 4,415,184 | A * | 11/1983 | Stephenson et al. | 285/47 |
| 4,422,504 | A * | 12/1983 | Moore | 166/241.7 |
| 4,484,785 | A * | 11/1984 | Jackson | 175/325.6 |
| 4,543,998 | A * | 10/1985 | Thomerson | 138/110 |
| 4,566,495 | A * | 1/1986 | Baker et al. | 138/149 |
| 4,615,543 | A * | 10/1986 | Cannon | 285/12 |
| 4,635,967 | A * | 1/1987 | Stephenson | 285/45 |
| 5,862,866 | A * | 1/1999 | Springer | 166/380 |
| 7,207,603 | B2 * | 4/2007 | Segreto | 285/47 |
| 2004/0178626 | A1 * | 9/2004 | Segreto | 285/47 |

\* cited by examiner

*Primary Examiner*—Patrick F Brinson
(74) *Attorney, Agent, or Firm*—Robert W Strozier (57) ABSTRACT

An insulating apparatus for use with vacuum insulated tubing sting to reduce heat loss through the joints, where the apparatus includes an insulator adapted to surround the joint and a latching joint protector adapted to surround the insulator and hold the insulator against the joint, where the protector also includes a channel for receiving injection and/or control tubing. The insulator is capable of reducing heat loss through the joints of a vacuum insulated tubing string by as much as 95%.

6 Claims, 11 Drawing Sheets

Fig. 1A

SECTION A-A　　SECTION B-B

Fig. 3F
SECTION B-B

Fig. 3E
SECTION A-A

INSULATOR APPARATUS FOR VACUUM INSULATED TUBING

RELATED APPLICATION

This application is a divisional application to U.S. patent application Ser. No. 10/744,575, filed 22 Dec. 2003, now U.S. Pat. No. 7,134,455 which claims the benefit of provisional priority to U.S. Provisional Patent Application Ser. No. 60/434,903 filed 20 Dec. 2002.

BACKGROUND OF THE INVENTION

1. Field of the Invention

The present invention relates to an insulator apparatus for vacuum insulating tubing.

More particularly, the present invention relates to an insulator apparatus for vacuum insulating tubing adapted to provide insulation at joints in a vacuum insulating tubing string including an insulating member and a joint protector surrounding and holding the member in place at the joints.

2. Description of the Related Art

In the petroleum industry, production tubing is disposed within a borehole for transporting oil and gas from subsurface bearing formations to the surface. This tubing is comprised of elongate sections threaded together to form a production string, the joint thereby formed being referred to variously as a tool joint, coupling, or upset.

In conjunction with this production tubing, it is frequently necessary to provide a system for delivering fluid media downhole. One reason may be to permit the injection of chemical treatment fluids near the producing formation for enhancing the production, for treatment of downhole conditions such as those involving undesirable corrosion, salt, or scale, and for delivery of corrosion or scale inhibitors, de-emulsifiers, or the like, downhole.

Yet another reason for providing these fluid delivery systems is for the transmission of fluid pressure to various downhole valves or tools from the surface for purposes of control or the like. Thus, various forms of injection or control lines referred to hereinafter generally as tubing and having internal diameters much smaller than that of the production tubing itself are provided which are disposed radially outward of and adjacent to the production tubing. In some cases the tubing is of an encapsulated variety wherein both the tubing and wire rope (which provides crush resistance from side forces) are encapsulated in an appropriate thermoplastic elastomer, whereas in other applications, the tubing may be of an unencapsulated or bare variety.

In other situations, electrical cables are routed downhole in like manner to the tubing for monitoring pressure instruments or for providing power for downhole motors or the like.

One problem with these tool joints and the associated tubing or cables (referred to hereinafter as tubing for convenience) is that they are frequently subjected to damage from contact with surrounding casing or the formation itself, such as when the production string is moved up or down within the borehole. This damage may be due to abrasion or compressive forces against the joint or tubing which often occurs as the tool joint is moved across a deviation in the borehole. Thus, means were sought for protecting this bare or unencapsulated tubing, cable and the tool joints from damage.

In deep water drilling operations, one difficulty in producing oil from such deep wells is the loss of heat associated with the oil as it flows out of the productive formation into the production tubing resulting in proportional increase in fluid viscosity and reduced well productivity. One answer to this vexing problem was the advent of vacuum insulated tubing, which provides a vacuum break between the production tubing and the outside world, greatly reducing heat loss as the productive fluid is communicated to the surface. However, heat loss is still a problem at the joints of the tubing where, out of necessity, the joints are not insulated and therefore heat can flow out of the joints to the surrounding.

Thus, there is a need in the art for an apparatus that can be attached to at the joints of vacuum insulated tubing insulating the joints from the outside world, while providing a protected conduit for production communication cables or other production wirelines.

SUMMARY OF THE INVENTION

The present invention provides an insulator apparatus for use with vacuum insulated tubing strings, where the apparatus includes an insulator adapted to insulate joints in the vacuum insulating tubing string and a joint protector adapted to secure the insulator against the joints, to protect the joints from damage during run in and run out and to provide a protected conduit adapted to receive injection or control tubing associated with the vacuum insulated tubing.

The present invention also provides an apparatus for protecting and insulating joints in a vacuum insulated tubing string, where the apparatus includes an insulator sleeve having a longitudinal slit, a substantially smooth outer surface, and an inner surface that conforms to an outer contour of the joint and to a portion of the tubing on either side of the joint. The apparatus also includes a joint protector having a first latching end and second latching end where the latching ends are adapted to secure the protector to the vacuum insulated tubing string on both sides of the joint. The protector also includes a center region having a insulator retaining member or a plurality of insulator retaining members, where the center region is adapted to hold the insulator against the joint. The protector also includes a conduit adapted to receive injection or control tubing allowing injection and/or control tubing to pass over the joint in a protected manner. The insulator can also include a strip of adhesive adapted to seal the longitudinal slit. Alternatively, the slit can include an interlocking fastener. The insulator can also include a spiral slit with or without an associated fastener.

The present invention also provides an apparatus for protecting and insulating joints in a vacuum insulated tubing string, where the apparatus includes an insulator sleeve having a longitudinal slit, a substantially smooth outer surface, and an inner surface that conforms to an outer contour of the joint and to a portion of the tubing on either side of the joint. The apparatus also includes a joint protector having a first latching end and second latching end where the latching ends are adapted to secure the protector to the vacuum insulated tubing string on both sides of the joint. The protector also includes a center region having a plurality of insulator retaining members, where the center region is adapted to hold the insulator against the joint. The protector also includes a conduit adapted to receive injection or control tubing allowing injection and/or control tubing to pass over the joint in a protected manner. The insulator can also include a strip of adhesive adapted to seal the longitudinal slit. Alternatively, the slit can include an interlocking fastener. The insulator can also include a spiral slit with or without an associated fastener.

The present invention also provides an apparatus for protecting and insulating joints in a vacuum insulated tubing string, where the apparatus includes an insulator sleeve having a longitudinal slit, a substantially smooth outer surface, and an inner surface that conforms to an outer contour of the joint and to a portion of the tubing on either side of the joint. The apparatus also includes a joint protector having a first latching end and second latching end where the latching ends are adapted to secure the protector to the vacuum insulated tubing string on both sides of the joint. The protector also includes a center region having a plurality of insulator retaining members, where the center region is adapted to hold the insulator against the joint. The protector also includes a conduit adapted to receive injection or control tubing allowing injection and/or control tubing to pass over the joint in a protected manner. The insulator can also include a strip of adhesive adapted to seal the longitudinal slit. Alternatively, the slit can include an interlocking fastener. The insulator can also include a spiral slit with or without an associated fastener.

The present invention provides an apparatus including an insulator adapted to conform to the outer contour of the joint and a portion of the tubing on either side of the joint and a protector including a pair of half-cylinder shaped sections which are interconnected at respective edges by an elongate piano-type hinge having a releasable pin. The opposite edges are provided with a plurality of pin guide sections matingly received by each other to define a pair of longitudinal pin slots when the protector is disposed about a tool joint. A pair of mating tapered pins are provided for each slot whereby when the pins are driven into their respective slots, the edges of the half-sections carrying the pin guides are drawn toward each other to effect progressively tighter engagement of the protector about the tool joint and tubing in an interference fit. Half-sections of varying radii of curvature and pins of varying taper are provided, whereby a variety of tool joints having differing outer dimensions may be accommodated, resulting in an effective interference fit by substituting half-sections and pins of appropriate size. A window intermediate the pair of pin slots facilitates lower pin installation while providing for slight flexing of the protector about the tool joint to further accommodate dimensional variations thereof.

The present invention provides a protected and insulated vacuum insulated tubing string including a vacuum insulated tubing string having a plurality of vacuum insulated tubing sections interconnected by joints and an insulating apparatus of this invention associated with each joint.

DESCRIPTION OF THE DRAWINGS

The invention can be better understood with reference to the following detailed description together with the appended illustrative drawings in which like elements are numbered the same.

DETAILED DESCRIPTION OF THE INVENTION

The inventors have found that heat loss from joints of a vacuum insulated tubing string can be reduced by as must as 95% or more by detachably affixing to each joint an insulating apparatus including an insulator adapted to conform to an outer surface of the joint and preferably to conform to a portion of the tubing on either side of each joint and a joint/insulator protector adapted to be interference fit to the tubing on either side of each joint, to secure the insulator in place and to provide a protected conduit for injection and control tubing. Thus, the inventors have found that a vacuum insulated tubing string can be formed including an insulator protector of this invention associate with each joint in the string reducing heat loss through the joints by as much as 95%.

The present invention broadly relates an insulator apparatus for use with vacuum insulated tubing strings, where the apparatus includes an insulator adapted to insulate joints in the vacuum insulating tubing string and a joint protector adapted to secure the insulator against the joints, to protect the joints from damage during run in and run out and to provide a protected conduit adapted to receive injection or control tubing associated with the vacuum insulated tubing.

The present invention broadly relates to a method for reducing heat loss at joint in a vacuum insulated tubing string including the step of detachably affixing to each joint of the string an insulator apparatus for use with vacuum insulated tubing strings, where the apparatus includes an insulator adapted to insulate joints in the vacuum insulating tubing string and a joint protector adapted to secure the insulator against the joints, to protect the joints from damage during run in and run out and to provide a protected conduit adapted to receive injection or control tubing associated with the vacuum insulated tubing.

The present invention broadly relates to a vacuum insulated tubing string including a vacuum insulated tubing string having a plurality of vacuum insulated tubing sections interconnected by joints and an insulating apparatus of this invention associated with each joint.

Suitable polymers for making the insulators of the present invention include, without limitation, insulating polymeric and/or ceramic materials. Preferred polymeric materials include, without limitation, thermal setting resins, thermoplastic elastomers, thermoplastics, or any other polymeric material or mixtures or combinations thereof, where the polymers good insulating properties and can be cast or molded by any standard casting or molding technique including traditional polymer casting, traditional molding, rotary molding, injection molding, or the like. Moreover, for structural plastics, the insulator can be cut using traditional cutting techniques. Preferred thermal setting resins include polyurethanes, elastomers, or the like. Preferred thermoplastics include structural plastics such as structure polyolefins exemplified by plastics such as high density polyethylene, polypropylene, polybutylene, polystyrenes, polyesters, polyurethanes, polyvinylchlorides, polyacrylates, nylons and other polyamides (Kevlar, Nomex), or the like. Preferred polyacrylates includes acetal resins such as Delrin® from DuPont or other similar injection moldable polymers. The polymers should have a thermal conductivity at or below about 0.5 W/m° C. at 100° C., preferably at or below about 0.4 W/m° C. at 100° C., and particularly at or below about 0.3 W/m° C. at 100° C. Exemplary polyurethanes include precision urethane with short hardnesses of 45A to about 100A including urethanes available from the manufacturers listed on the world wide web at urethane-ez.com/urethane. Preferred urethane polymers should have a tensile strength between about 4,000 psi and about 14,000 psi at 75° F., a 100% modulus of elasticity at 75° F. between about 1,000 psi and about 550,000 psi, and an elongation of about at 75° F. between about 30% and 1000. Particularly preferred urethanes have the physical characteristics listed in Table IA-B.

TABLE IA

Physical Properties of Preferred Urethanes

| Property | Urethane 90A PPG | | | Urethane 90A PTMEG | | |
| --- | --- | --- | --- | --- | --- | --- |
| | 0° | 75° | 150° F. | 0° | 75° | 150° F. |
| Modulus, 100%, psi | 4142 | 1083 | 967 | 1194 | 1140 | 956 |
| Modulus, 200%, psi | 5009 | 1673 | 1303 | 1701 | 1612 | 1241 |
| Modulus, 300%, psi | | 2530 | | 2528 | 2416 | 1600 |
| Tensile Strength, psi | 5851 | 3167 | 1764 | 7244 | 5446 | 2025 |
| % Elongation | 263 | 330 | 293 | 393 | 396 | 332 |
| Die C Tear, psi | 660 | 189 | 126 | 390 | 306 | 220 |
| Trouser Tear, psi | 188 | 48 | 23 | 108 | 66 | 27 |
| Bashore Resilience, % | | 29 | | | 43 | |
| Compression Set, % (Method B) | | 31 | | | 24 | |
| Compression Stress @ 1%, psi | | 32 | | | 57 | |
| Modulus of Rigidity, psi | | N/A | | | 3559 | |
| Young's Modulus, psi | | 6800 | | | 5097 | |
| Shear Modulus, psi | | N/A | | | 1700 | |
| Bulk Modulus, psi | | N/A | | | $9.9 \times 10^3$ | |
| Poisson's Ratio | | 0.475 | | | 0.499 | |

TABLE IB

Specific Heat and Thermal Conductivity Properties of the Preferred Urethanes

| | Urethane 90A PPG | | Urethane 90A PTMEG | |
| --- | --- | --- | --- | --- |
| | Temperature °C. | Heat Flow J/kg · °C. | Temperature °C. | Heat Flow J/kg · °C. |
| Specific Heat | 20 | −1729 | 10 | −1544 |
| | 40 | −1803 | 30 | −1669 |
| | 60 | −1844 | 50 | −1690 |
| | 80 | −1897 | 70 | −1716 |
| | 100 | −1913 | 90 | −1720 |
| | 120 | −1907 | 100 | −1710 |
| | 140 | −1885 | 130 | −1713 |

| | Urethane 90A PPG | | Urethane 90A PTMEG | |
| --- | --- | --- | --- | --- |
| | Temperature °C. | Conductivity W/m · °C. | Temperature °C. | Conductivity W/m · °C. |
| Thermal Conductivity | 100 | 0.276 | 60.4 | 0.208 |
| | 125 | 0.266 | 68.5 | 0.202 |
| | 150 | 0.259 | 100.7 | 0.213 |
| | 175 | 0.253 | 126.9 | 0.215 |

Suitable materials out of which the protectors of this invention can be made include, without limitation, metal especially iron alloys such as forged steel, stainless steel, or the like. Generally, the insulators are designed to decrease heat loss from the joint of a vacuum insulated tubing by 50% or more, preferably, by 75% or more, particularly, by 85% or more and especially by 90% or more.

Insulating Apparatus for Recessed Jointed Vacuum Insulated Tubing

Referring now to FIGS. 1A-F, a preferred embodiment of an insulating apparatus, generally 100, of this invention is shown detachably affixed to a joint 102 of a vacuum insulated production string 104. The string 104 is shown with a first string section 106a and a second string section 106b. The tube section 106a&b include inner tubes 108b&b and outer tubes 110a&b with vacuum gaps 112a&b interposed therebetween except at the joint 102 where the outer tubes 110a&b end forming a recessed area 114. The joint 102 is formed from a male connector 116 formed out of a distal end 118 of the inner tube 108a of the first section 106a and a female connector 120 formed out of a proximal end 122 of the inner tube 108b of the second tube section 106b. Because the joint 102 does not include a vacuum gap, heat can flow from an interior 124 of the string 104 to the surroundings, a problem to be avoided an a problem solved by the apparatuses of this invention.

Figure 1A:
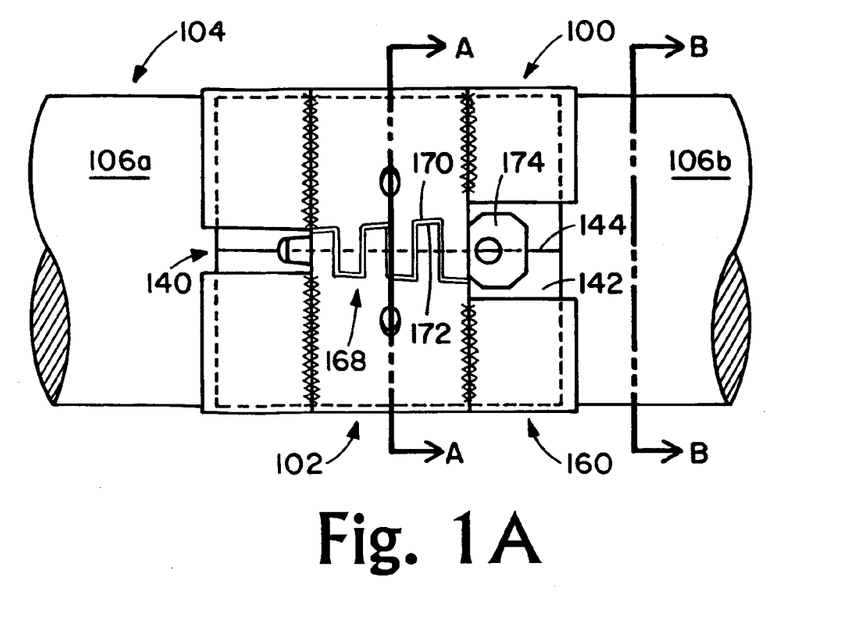
FIGS. 1A-F depict views of a preferred embodiment of the insulating apparatus of this invention detachably affixed to a joint of a vacuum insulated tubing string.
Figure 1B:
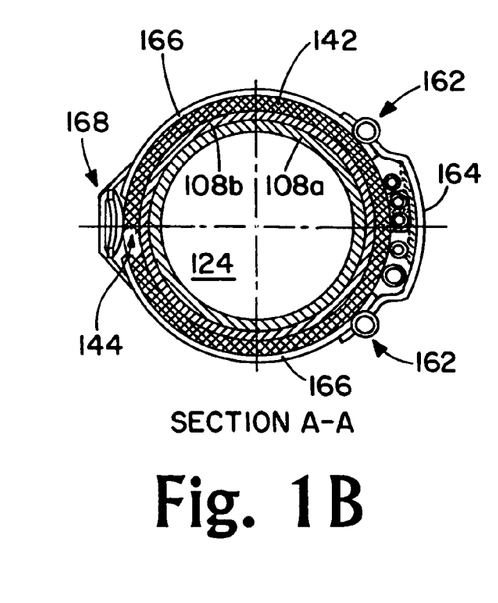
Figure 1C:
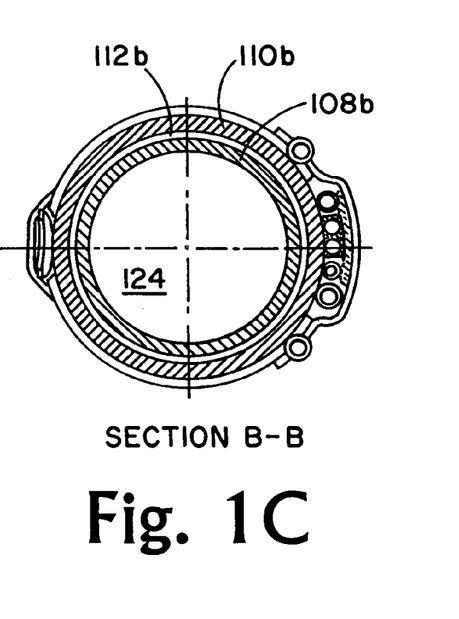
Figure 1D:
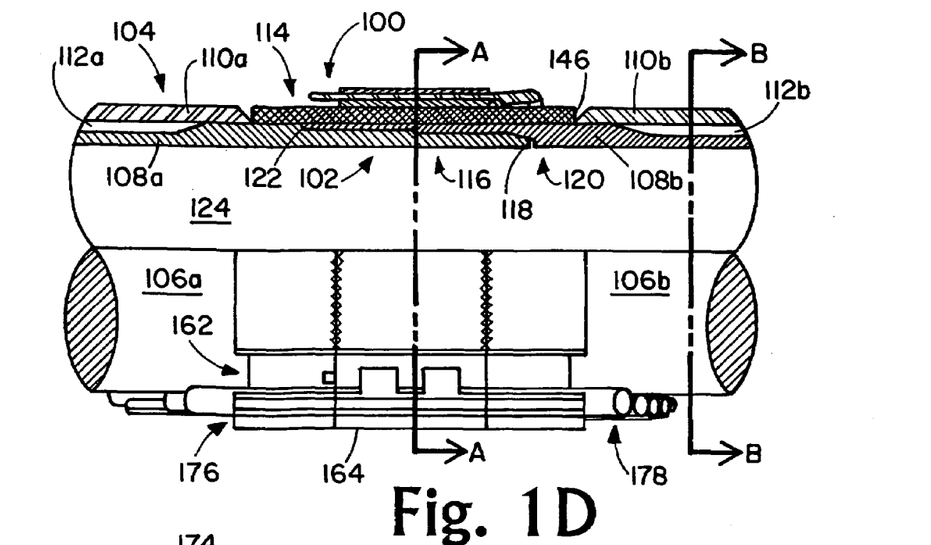
Figures 1E, 1F:
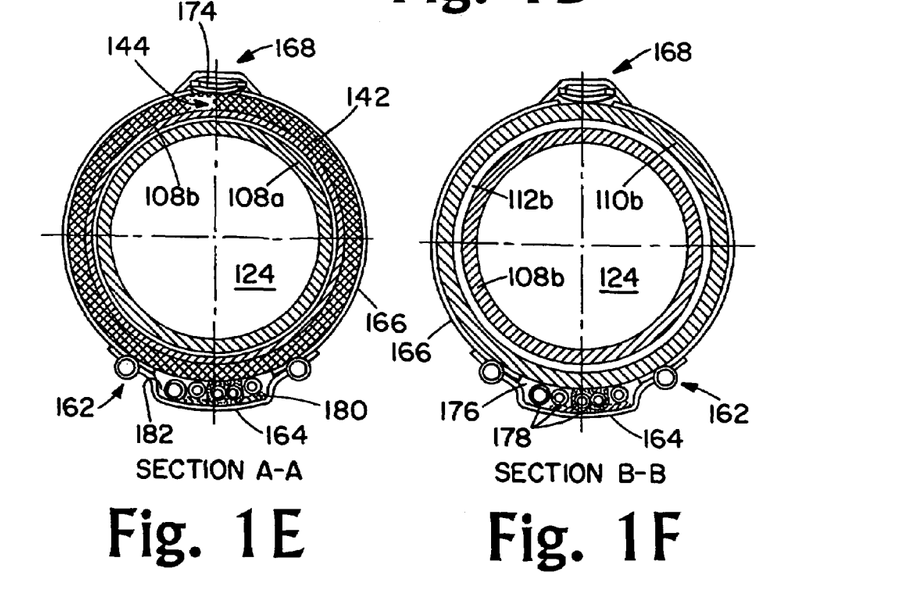
Figure 1G:
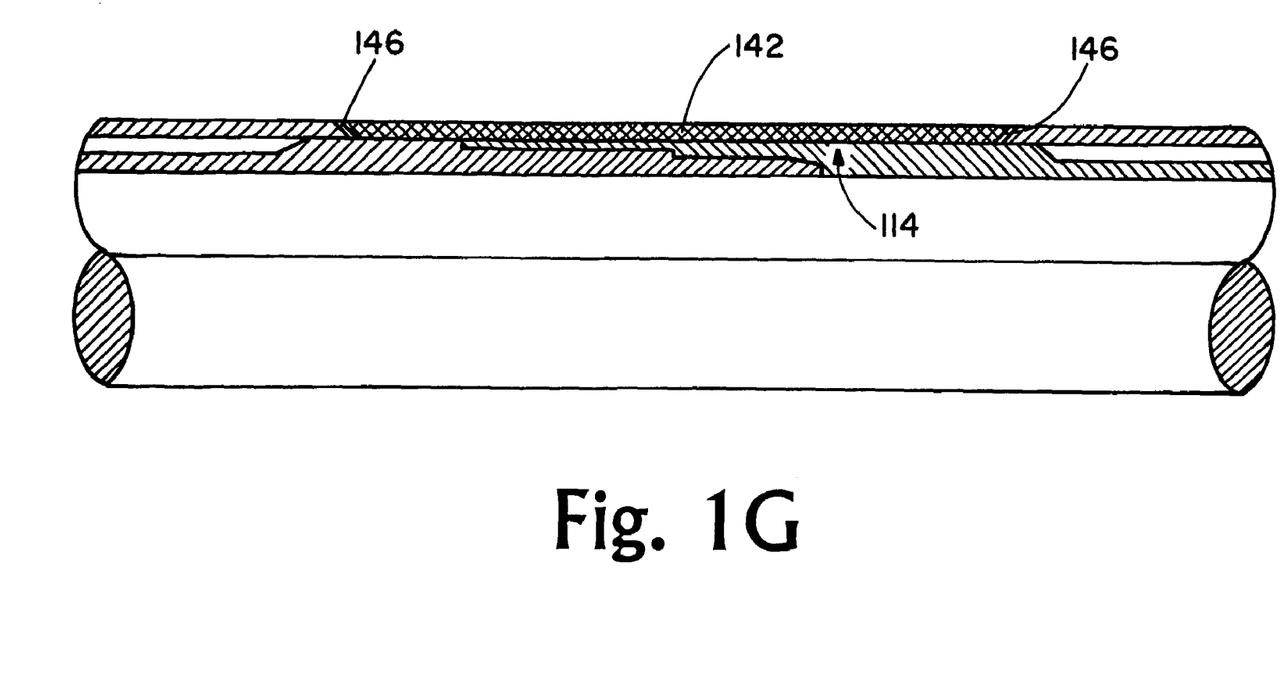
FIG. 1G depicts a cut away view of an insulator of this invention having a lower surface that conforms to a recess in the joint of a vacuum insulated tubing string.
Figure 2A:
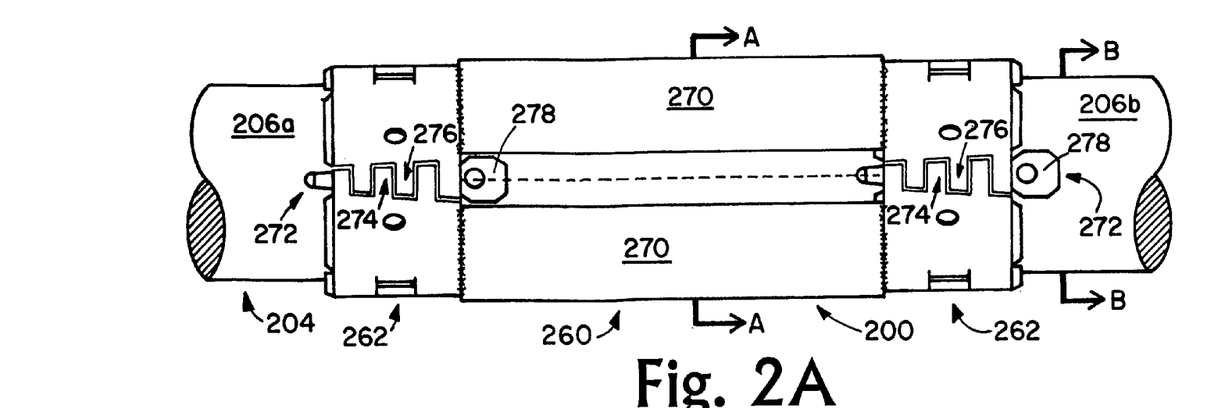
FIG. 2A-F depict views of another preferred embodiment of the insulating apparatus of this invention detachably affixed to a joint of a vacuum insulated tubing string.
Figure 2B:
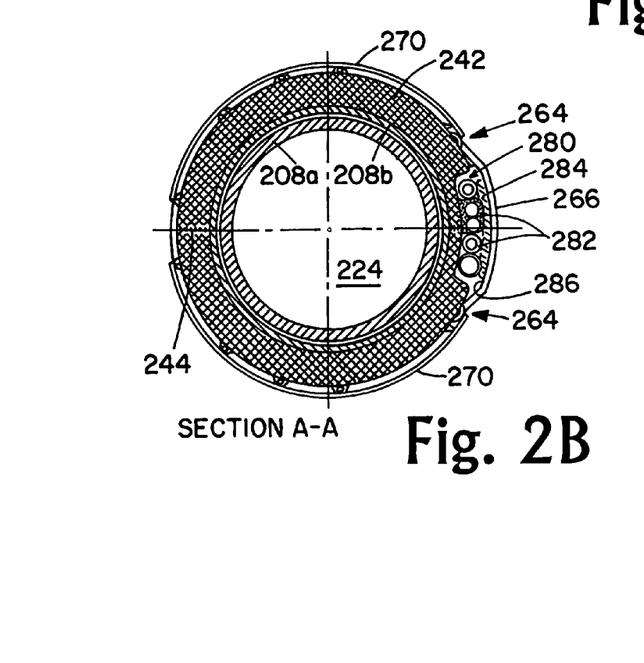
Figure 2C:
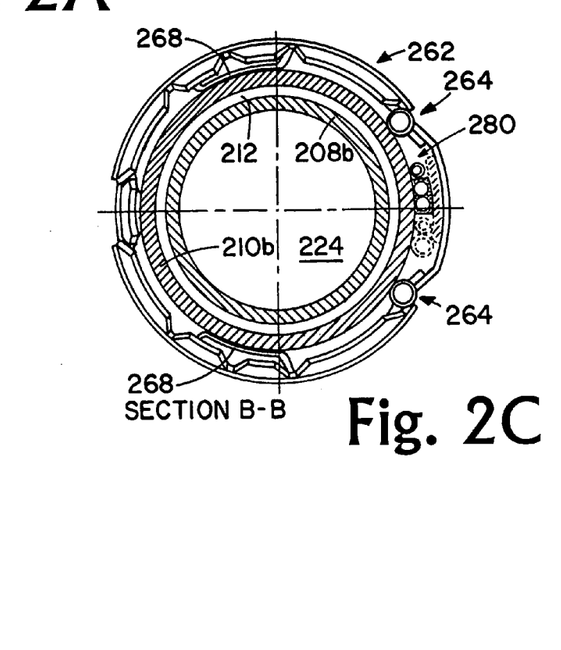
Figures 2D, 2E, 2F:
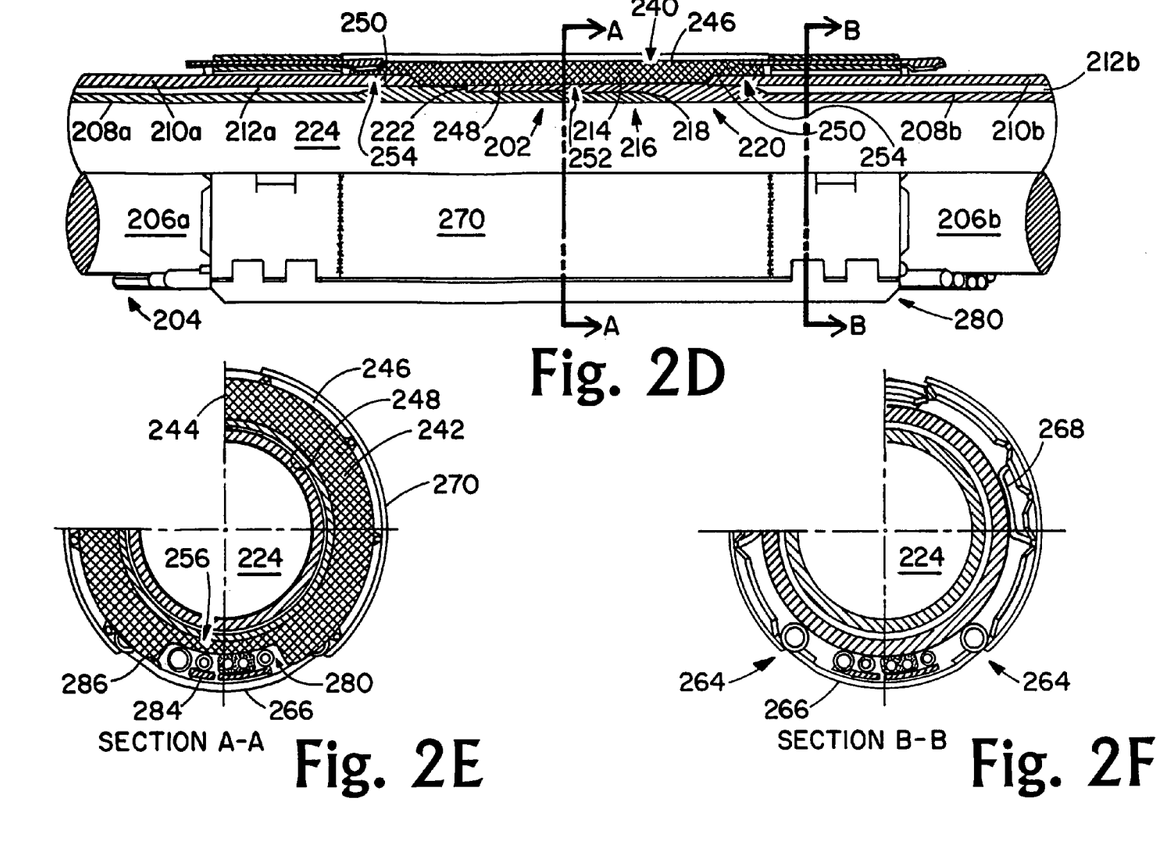
Figure 3A:
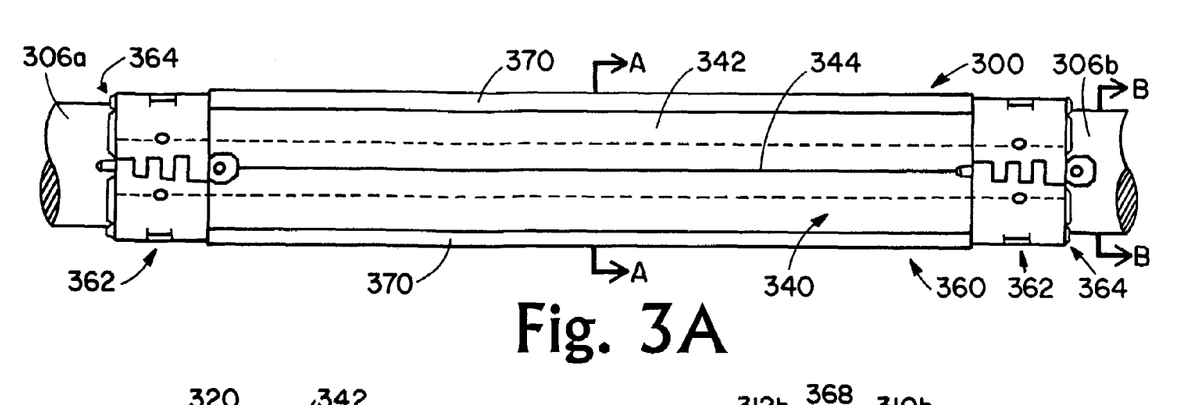
FIG. 3A-F depict views of another preferred embodiment of the insulating apparatus of this invention detachably affixed to a joint of a vacuum insulated tubing string.
Figure 3B:
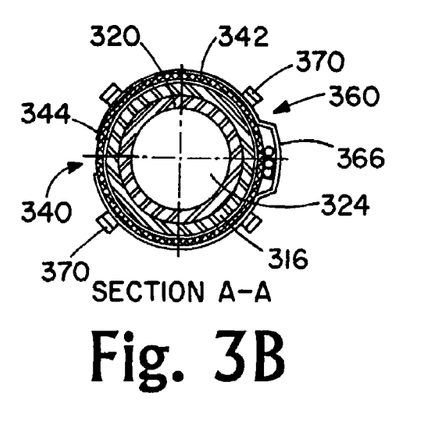
Figure 3C:
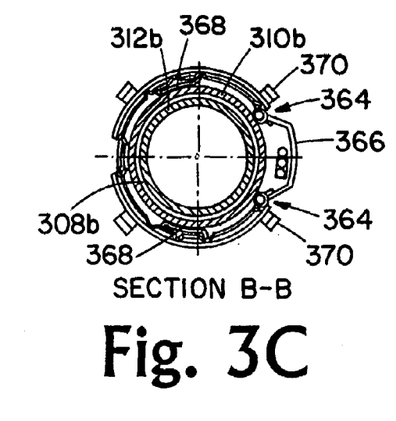
Figure 3D:
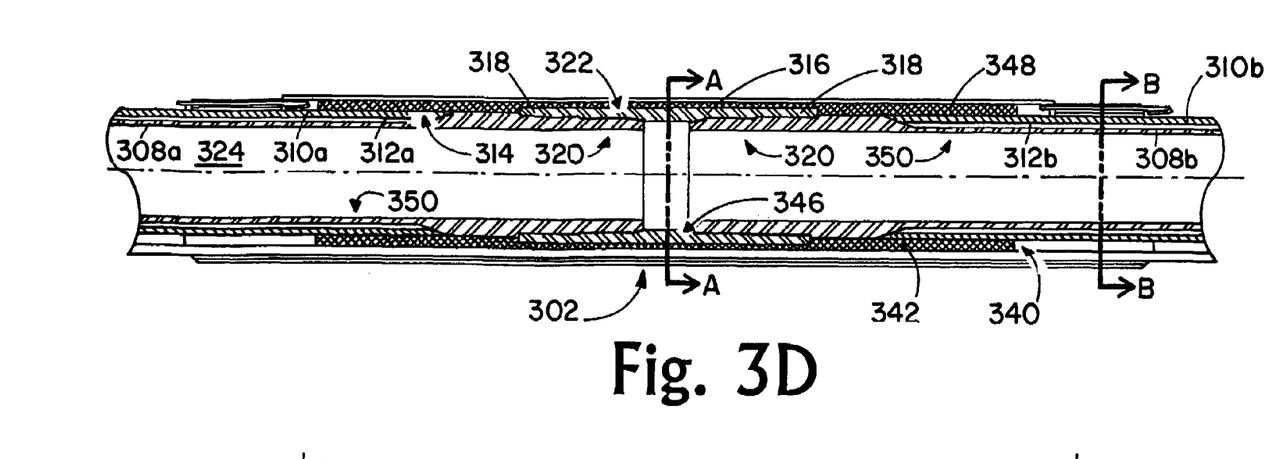
Figure 3E:
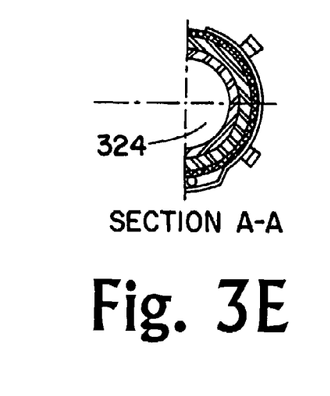
Figure 3F:
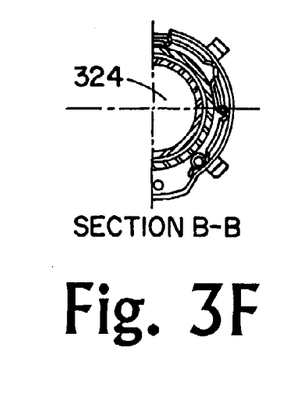
Figure 4A:
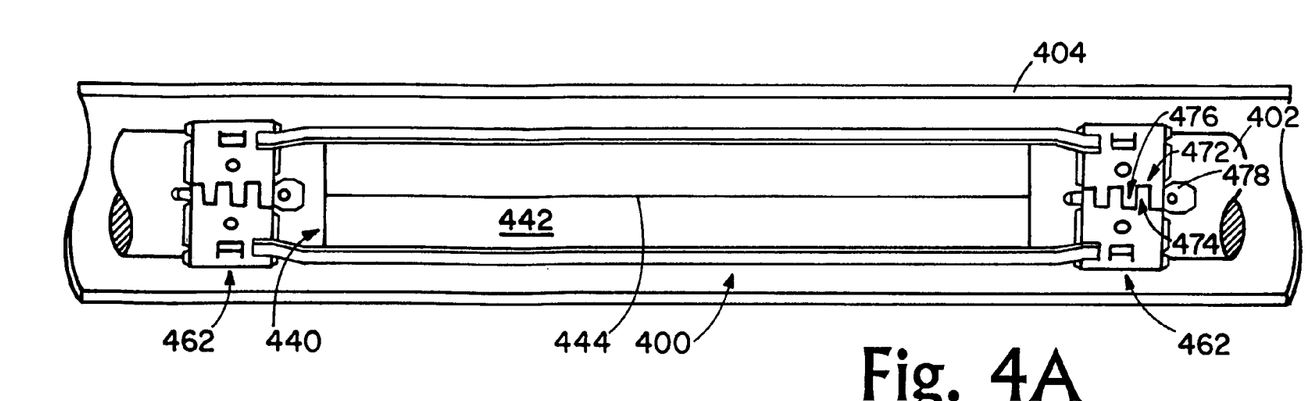
FIG. 4A-D depict views of another preferred embodiment of the insulating apparatus of this invention detachably affixed to a joint of a vacuum insulated tubing string.
Figure 4B:
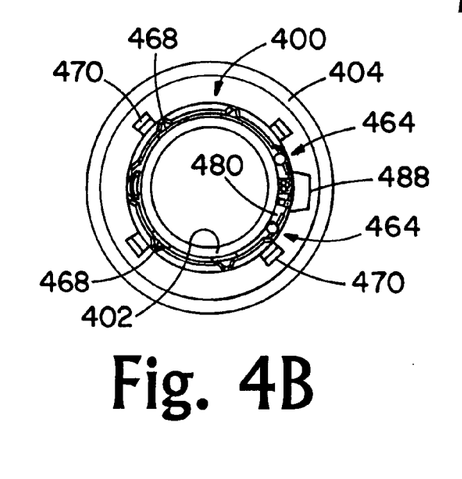
Figure 4C:
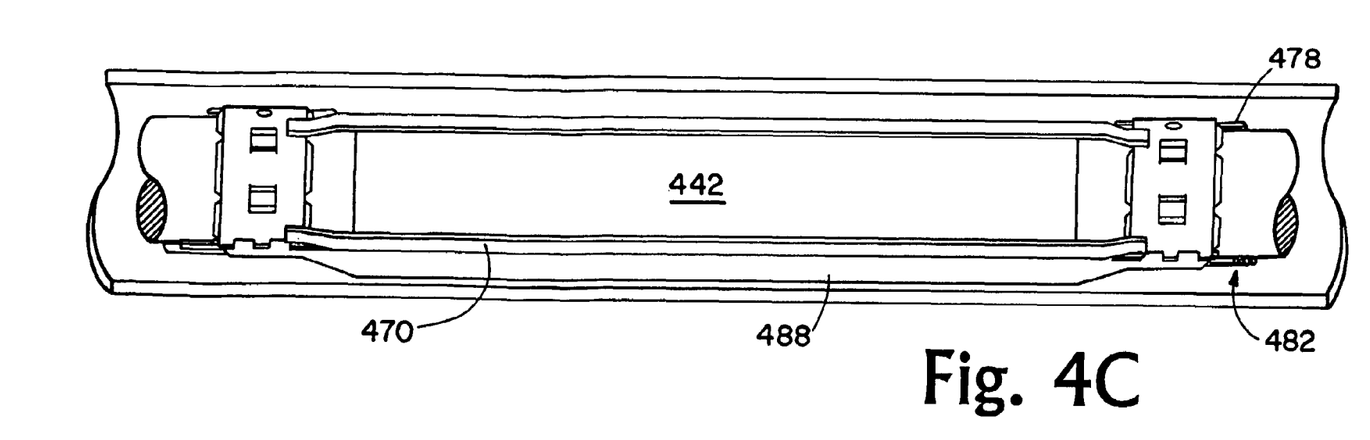
Figure 4D:
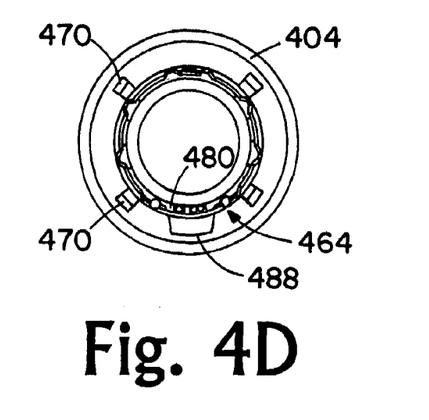
Figure 5A:
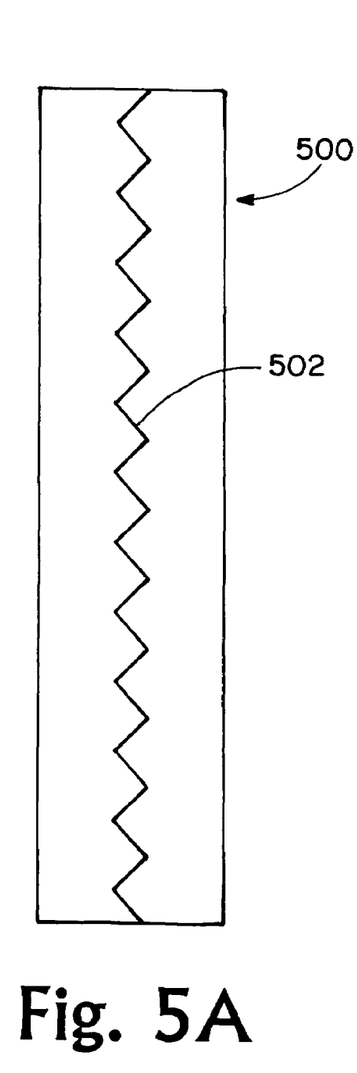
FIG. 5A-F depict other preferred embodiment of insulators of this invention.
Figure 5B:
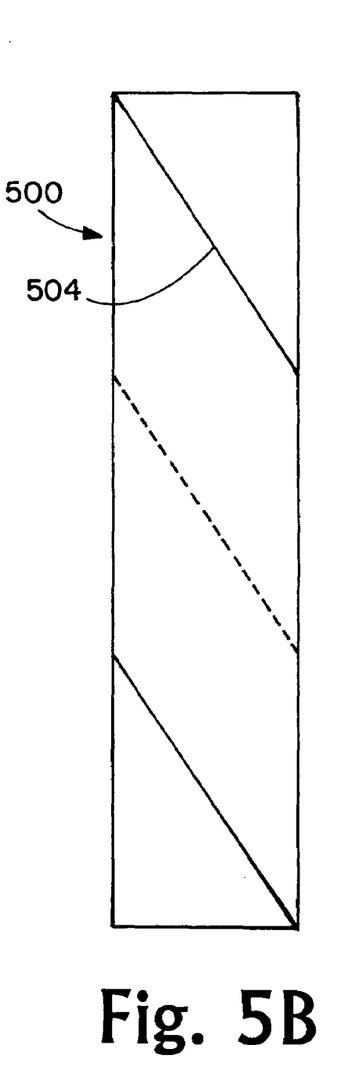
Figure 5C:
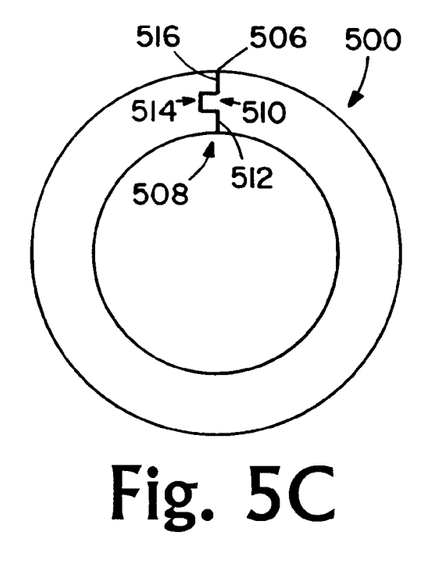
Figure 5D:
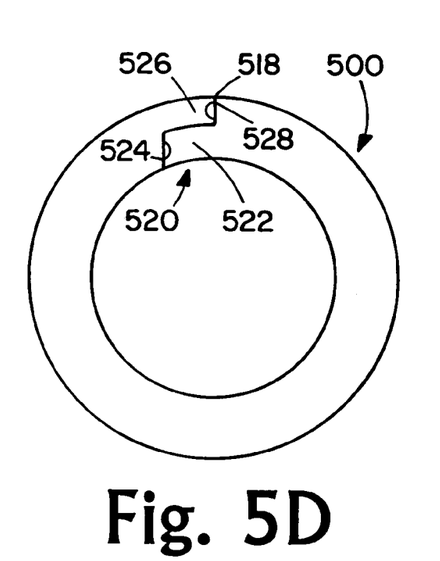
Figure 5E:
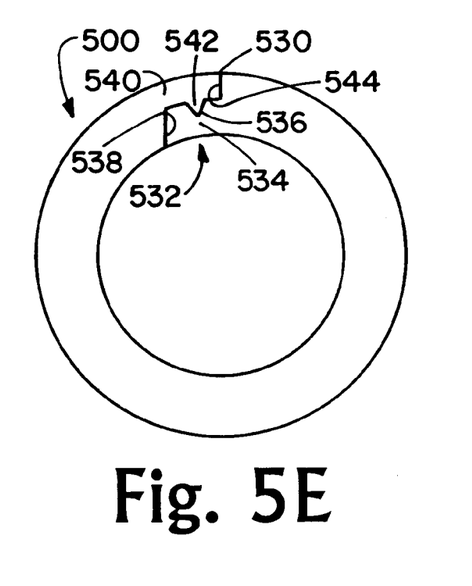
Figure 5F:
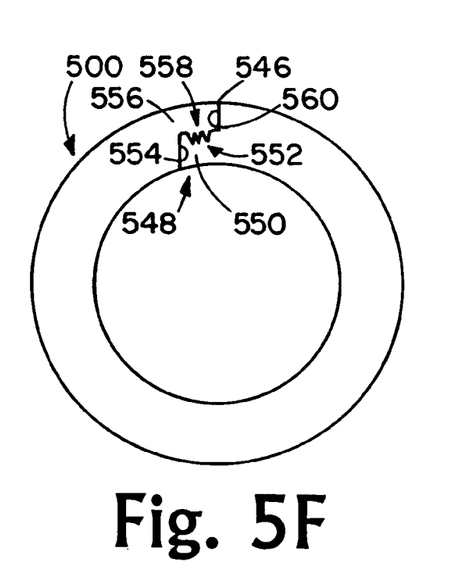

The insulating apparatus includes an insulator 140 and a latching protector 160. The insulator 140 comprises a cylinder sleeve 142 having a longitudinal slit 144 where the slit 144 allows the sleeve 142 to be opened and fitted into the recess 114. The slit 144 can be left as is or can be sealed by an insulating sealing compound such as a fast drying thermoplastic, thermosetting resin, other polymeric insulating material or mixtures or combinations thereof Although the sleeve 142 of FIGS. 1A-F is cylindrical with straight edges 146, the sleeve 142 can be designed to conform to the recess 114 so that its edges 146 are now tapered as shown in FIG. 1G.

The protector 160 includes two hinges 162, a raised portion 164 separating the two hinges 162, two arcuate sections 166 and an interdigitated latch 168 having a first end 170 and a second end 172 adapted to receive a key 174, which locks the protector 160 in place with an interference fit. The latch 168 and key 174 are defined in more detail in U.S. Pat. No. 4,615,543, incorporated therein by reference. When the protector 160 is placed around the insulator 140 and closed, the key 174 is inserted into the interdigitated latch 168 in such a way that the key 174 pulls the latch 168 together creating an interference fit against the insulator 160 and/or the sections 106a&b. The raised portion 164 forms a protected channel 176 adapted to receive injection and/or control tubing, lines, or cables 178 and can include a cushion 180 on its inner surface 182.

Referring now to FIGS. 2A-F, another preferred embodiment of an insulating apparatus, generally 200, of this invention is shown detachably affixed to a joint 202 of a vacuum insulated production string 204. The string 204 is shown with a first string section 206a and a second string section 206b. The tube sections 206a&b include inner tubes 208b&b and outer tubes 210a&b with vacuum gaps 212a&b interposed therebetween except at the joint 202 where the outer tubes 210a&b end forming a recessed area 214. The joint 202 is formed from a male connector 216 formed out of a distal end 218 of the inner tube 208a of the first tube section 206a and a female connector 220 formed out of a proximal end 222 of the inner tube 208b of the second tube section 206b. Because the joint 202 does not include a vacuum gap, heat can flow from an interior 224 of the string 204 to the surroundings, a problem to be avoided and a problem solved by the apparatuses of this invention.

The insulating apparatus includes an insulator 240 and a latching protector 260. The insulator 240 comprises a cylinder sleeve 242 having a longitudinal slit 244, a substantially straight outer surface 246 and an inner surface 248 that conforms to the recess 214 and to portions 250 of the sections 206a&b. Thus, the inner surface 248 includes an raised section 252 conforming to the recess 214 and wings 254 extending over the portions 250 of the section 206a&b, where the portions 250 extend out a sufficient distance from the joint 202 to provide improved joint insulation, where the sufficient distance is at least sufficient to extend past the start of the vacuum gaps 210a&b. The insulator 240 also includes a groove 256 for receiving injection and/or control tubing 282. The slit 244 allows the sleeve 242 to be opened and the conforming raised section 252 of the inner surface 248 of the insulator 240 fitted into the recess 214, with the wings 254 extending over the portions 250. The slit 244 can be left as is or can be sealed by an insulating sealing compound such as a fast drying thermoplastic, thermosetting resin, other polymeric insulating material or mixtures or combinations thereof.

The protector 260 includes two latching ends 262 having two hinges 264, a raised portion 266 separating the two hinges 264, and outer tube engaging members 268. The protector 260 also includes longitudinally extended arcuate sections 270 interconnecting the latching ends 262 and the latching ends 262 also include an interdigitated latch 272 having a first digitated end 274 and a second digitated end 276 adapted to receive a key 278, which locks the protector 260 in place with an interference fit. The latches 272 and keys 278 are defined in more detail in U.S. Pat. No. 4,615,543, incorporated therein by reference. When the protector 260 is placed around the insulator 240 and joint 202 and closed, the keys 278 are inserted into the interdigitated latches 272 in such a way that the keys 278 pull the latches 272 together creating an interference fit against the string 202 on each side of each joint. The raised portion 266 forms a protected channel 280 adapted to receive injection and/or control tubing, lines, or cables 282 and can include a cushion 284 on its inner surface 286.

Insulating Apparatus for Raised Jointed Vacuum Insulated Tubing

Referring now to FIGS. 3A-F, another preferred embodiment of an insulating apparatus, generally 300, of this invention is shown detachably affixed to a joint 302 of a vacuum insulated production string 304. The string 304 is shown with a first string section 306a and a second string section 306b. The tube sections 306a&b include inner tubes 308b&b and outer tubes 310a&b with vacuum gaps 312a&b interposed therebetween except at the joint 302 where the outer tubes 310a&b end forming a recessed area 314. The joint 302 is formed from a joint collar 316 having two female end connectors 318 adapted to receive male connectors 320 associated with the tube sections 306a&b. The joint collar 316 is larger than the section 306a&b forming a raised joint section 322. Because the joint 302 does not include a vacuum gap, heat can flow from an interior 324 of the string 304 to the surroundings, a problem to be avoided and a problem solved by the apparatuses of this invention.

The insulating apparatus includes an insulator 340 and a latching protector 360. The insulator 340 comprises a cylinder sleeve 342 having a longitudinal slit 344. The sleeve 342 also includes a groove 346 adapted to conform to the raised joint section 322 of the joint 302. The sleeve 342 also includes end portions 348 that extend past the joint collar 316 over portions 350 of the section 306a&b, where the portions 350 extend out a sufficient distance from the joint 302 to provide improved joint insulation, where the sufficient distance is at least sufficient to extend past the start of the vacuum gaps 310a&b of the section 306a&b. The slit 344 allows the sleeve 342 to be opened and fitted into the recess 314. The slit 344 can be left as is or can be sealed by an insulating sealing compound such as a fast drying thermoplastic, thermosetting resin, other polymeric insulating material or mixtures or combinations thereof.

The protector 360 includes two latching ends 362 having two hinges 364, a raised portion 366 separating the two hinges 364, and outer tube engaging members 368. The protector 360 also includes longitudinally extended members 370 interconnecting the latching ends 362. The latching ends 362 also include interdigitated latches 372, each latch 372 having a first digitated end 374 and a second digitated end 376 adapted to receive a key 378, which locks the protector 360 in place with an interference fit. The latches 372 and keys 378 are defined in more detail in U.S. Pat. No. 4,615,543, incorporated therein by reference. When the protector 360 is placed around the insulator 340 and joint 302 and closed, the keys 378 are inserted into the interdigitated latches 372 in such a way that the keys 378 pull the latches 372 together creating an interference fit against the string 302 on each side of each joint. The raised portion 366 forms a protected channel 380 adapted to receive injection and/or control tubing, lines, or cables 382 and can include a cushion 384 on its inner surface 386.

Alternate Protector Design

Referring now to FIGS. 4A-D, another preferred embodiment of an insulating apparatus, generally 400, of this invention is shown to include detachably affixed to a joint (not shown) of a vacuum insulated production string 402 within a cased well 404. The insulating apparatus includes an insulator 440 and a latching protector 460. The insulator 440 comprises a cylinder sleeve 442 having a longitudinal slit 444 where the slit 444 allows the sleeve 442 to be opened and fitted over each joint of the string 402. The slit 444 can be left as is or can be sealed by an insulating sealing compound such as a fast drying thermoplastic, thermosetting resin, other polymeric insulating material or mixtures or combinations thereof. Moreover, as shown below the slit does not have to be straight and can be formed with fastening or interlocking ends.

The protector 460 includes two latching ends 462 having two hinges 464, an arcuate portion 466 separating the two hinges 464, and outer tube engaging members 468. The protector 460 also includes four substantially parallel, longitudinally extended members 470 interconnecting the latching ends 462 so that the insulator 440 is held in place by the four members 470. The latching ends 462 also include interdigitated latches 472, each latch 472 having a first digitated end 474 and a second digitated end 476 adapted to receive a key 478, which locks the protector 460 in place with an interference fit. The latches 472 and keys 478 are defined in more detail in U.S. Pat. No. 4,615,543, incorporated therein by reference. When the protector 460 is placed around the insulator 440 and joint 402 and closed, the keys 478 are inserted into the interdigitated latches 472 in such a way that the keys 478 pull the latches 472 together creating an interference fit against the string 402 of either side of each joint. The arcuate portion 466 forms a protected channel 480 adapted to receive injection and/or control tubing, lines, or cables 482 and can include a cushion 484 on its inner surface 486. The protector 460 also includes a raised injection and/or control tubing conduit 488 also interconnecting the two ends 462. Thus, the member 470 and the conduit 488 structurally hold the two ends 462 of the protector 460.

Alternate Insulator Designs

Referring now to FIGS. 5A-F, several other preferred embodiment of insulators 500 of this inventor are shown. Looking at FIG. 5A, the insulator 500 includes a zig-zagged slit another 502. Looking at FIG. 5B, the insulator 500 includes a spiral slit 504. Looking at FIG. 5C, the insulator 500 includes a slit 506 having a fastener 508. The fastener 508 includes a male connector 510 associated with a first end 512 of the insulator 500 and a female connector 514 associated with a second end 516 of the insulator 500. Looking at FIG. 5D, the insulator 500 includes a slit 518 having a fastener 520. The fastener 520 includes an inner longitudinal lip 522 associated with a first end 524 of the insulator 500 and an outer longitudinal lip 526 associated with a second end 528 of the insulator 500. Looking at FIG. 5E, the insulator 500 includes a slit 530 having a fastener 532. The fastener 532 includes an inner longitudinal lip 534 having a longitudinal groove 536 associated with a first end 538 of the insulator 500 and an outer longitudinal lip 540 having a longitudinal indentation 542 associated with a second end 544 of the insulator 500. Looking at FIG. 5F, the insulator 500 includes a slit 546 having an interlocking fastener 548. The interconnecting fastener 548 includes an inner longitudinal lip 550 having longitudinal grooves 552 associated with a first end 554 of the insulator 500 and an outer longitudinal lip 556 having longitudinal indentations 558 associated with a second end 560 of the insulator 500, where the grooves 552 are designed to receive the indentations 558 to form a locking fastener. Although several insulators with slit ends designed to engage each other in a substantially gap free manner have been described, any other fastening or means for bring the slit end together in a substantially gap free manner.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that maybe made which do not depart from the scope and spirit of the invention as described above and claimed hereafter.

We claim:

1. A vacuum insulated tubing string comprising:
   a plurality of tubing section, each of the sections including an inner tube, an outer tube, a vacuum gap interposed therebetween, a first connector associated with a first end of each section and a second connector associated with a second end of each section, where the connectors on adjacent sections either directly form a joint or form a joint with a joint collar interconnecting the section connectors; and
   a plurality of insulating apparatuses, each apparatus disposed on an exterior surface of one of the joints of the string and adapted to surround the joint and a latching joint protector adapted to surround the insulator and hold the insulator against its associated joint, where the protector also includes a channel for receiving injection and/or control tubing.

2. The string of claim 1, wherein the insulator comprises a cylindrical sleeve including a longitudinal slit.

3. The string of claim 1, wherein the insulator comprises a cylindrical sleeve including a longitudinal slit, a substantially straight outer surface and an inner surface conforming to an outer surface of the joint.

4. The string of claim 1, wherein the insulator comprises a cylindrical sleeve including a longitudinal slit, a substantially straight outer surface and an inner surface conforming to an outer surface of the joint and to portions of the string on either side of the joint.

5. The string of claim 1, wherein the joint comprises a connection between a female connector of a first string section and a male connector of a second string section.

6. The string of claim 1, wherein the joint comprises connections between a female connector of a joint collar and a first male connector of a first string section and a second female connector of the joint collar and a second male connector of a second string section.

* * * * *